US 6,870,970 B2

(12) United States Patent
Leonard et al.

(10) Patent No.: US 6,870,970 B2
(45) Date of Patent: Mar. 22, 2005

(54) METHOD OF VARYING OPTICAL PROPERTIES OF PHOTONIC CRYSTALS ON FAST TIME SCALES USING ENERGY PULSES

(76) Inventors: Stephen W. Leonard, 80 Lichfield Rd., Unionville, Ontario (CA), L3R 0W9; Henry M. van Driel, 386 Clarksville Ct., Mississauga, Ontario (CA), L5A 1G8; Jorg Schilling, Carl-Robert-Str 5, Halle (DE), 06114; Ralf Boris Wehrspohn, Kleine Ulrichstrasse 24a, Halle (DE), 06108; Ulrich Gosele, Rathenauplatz 4, Halle (DE), 06114; Stefan Senz, Streiberstrasse 4, Halle (DE), 06110

( * ) Notice: Subject to any disclaimer, the term of this patent is extended or adjusted under 35 U.S.C. 154(b) by 305 days.

(21) Appl. No.: 10/128,512

(22) Filed: Apr. 24, 2002

(65) Prior Publication Data

US 2003/0202728 A1 Oct. 30, 2003

(51) Int. Cl.$^7$ .............................................. G02F 1/295
(52) U.S. Cl. ............................ 385/5; 385/122; 359/326
(58) Field of Search ............................ 349/38, 172, 33; 359/326, 328, 330; 372/21, 22, 102, 53, 70; 385/5–8, 122, 129, 130, 141, 147

(56) References Cited

U.S. PATENT DOCUMENTS

| | | | | |
|---|---|---|---|---|
| 5,274,727 A | * | 12/1993 | Ito et al. | 385/122 |
| 5,519,802 A | * | 5/1996 | Field et al. | 385/129 |
| 5,615,041 A | * | 3/1997 | Field et al. | 359/326 |
| 6,088,380 A | * | 7/2000 | Lawandy | 372/102 |
| 6,542,682 B2 | * | 4/2003 | Cotteverte et al. | 385/125 |

OTHER PUBLICATIONS

Painter, O. et al., "Two Dimensional Photonic Gand–Gap Defect Mode Laser", www.sciencemag.org, Science, vol. 284, pp. 1819–1821, Jun. 1999.

Chow, Edmond et al., "Quantitative analysis of bending efficiency in photonic–crystal waveguide bends at λ=1.55 μm Wavelengths", Optics Letters, vol. 26, No. 5, pp. 286–288, Mar. 2001.

(List continued on next page.)

*Primary Examiner*—Akm Enayet Ullah
(74) *Attorney, Agent, or Firm*—Lynn C. Schumacher; Hill & Schumacher (57) ABSTRACT

The present invention provides a method for fast switching of optical properties in photonic crystals using pulsed/modulated free-carrier injection. The results disclosed herein indicate that several types of photonic crystal devices can be designed in which free carriers are used to vary dispersion curves, stop gaps in materials with photonic bandgaps to vary the bandgaps, reflection, transmission, absorption, gain, or phase. The use of pulsed free carrier injection to control the properties of photonic crystals on fast timescales forms the basis for all-optical switching using photonic crystals. Ultrafast switching of the band edge of a two-dimensional silicon photonic crystal is demonstrated near a wavelength of 1.9 μm. Changes in the refractive index are optically induced by injecting free carriers with 800 nm, 300 fs pulses. Band-edge shifts have been induced in silicon photonic crystals of up to 29 nm that occurs on the timescale of the pump pulse. The present invention also provides a method of producing a virtual or temporary photonic crystal using free carrier injection into pure semiconductors, bulk or thin film, in which the carriers are generated in patterns which create a patterned refractive index contrast used to steer light beams in the semiconductor while it is being pulsed.

45 Claims, 9 Drawing Sheets

OTHER PUBLICATIONS

Nefedov, I.S. et al., "Low Threshold Photonic Band–Gap Optical Logic Gates", Laser Physics, vol. 10, No. 2, pp. 640–643, 2000, no date.

Noda, Susumu et al., "Trapping and Emission of Photons by a Single Defect in a Photonic Bandgap Structure", Nature, vol. 407, pp. 608–610, Oct. 2000, no date.

Cregan, R.F. et al., "Single–Mode Photonic Band Gap Guidance of Light in Air", www.sciencemag.org, Science, vol. 285, pp. 1537–1539, Sep. 1999, no date.

Brown, T.G. et al., "Brag Solitons and Optical Switching in Nonlinear Periodic Structures: An Historical Perspective", Optics Express, vol. 3, No. 11. pp. 385–388, Nov. 1998, no date.

Leonard, S. W. et al., "Rapid Communications", Physical Review B, Condensed Matter and Materials Physics, The American Physical Society, Third Series, vol. 61, No. 4, pp. R2389–R2392, Jan. 2000, no date.

Yoshino, Katsumi et al., "Tunable Optical Stop Band and Reflection Peak in Synthetic Opal Infiltrated with Liquid Crystal and Conducting Polymer as Photonic Crystal", Applied Physics, vol. 38, pp. L961–L963, Aug. 1999, no date.

Gallant, M.I. et al., "Infrared Reflectivity Probing of Thermal and Spatial Properties of Laser–Generated Carriers in Germanium", Physical Review B, The American Physical Society, vol. 26, No. 4, pp. 2133–2146, Aug. 1982, no date.

Doany, F.E., et al., "Carrier Lifetime Versus Ion–Implantation Dose in Silicon on Sapphire", Applied Physics Letter 50(B) American Institute of Physics, pp. 460–462, Feb. 1987, no date.

Smith, F.W. et al., "Picosecond GaAs–Based Photoconductive Optoelectronic Detectors", Applied Physics Letter 54(10), American Institute Physics, pp. 890–892, Mar. 1989, no date.

Hacha, Alain et al., "Ultrafast All–Optical Switching in a Silicon–Based Photonic Crystal", Applied Physics Letters, vol. 77, No. 25, American Institute of Physics, pp. 4089–4091, Dec. 2000, no date.

Halevi, P. et al., "Tunable Photonic Crystals with Semiconducting Constituents", Physical Review Letters, The American Physical Society, vol. 85, No. 9, pp. 1875–1876, Aug. 2000, no date.

Susa, Nobuhiko, "Change in Transmittance Due to Free Carriers in Two–Dimensional Photonic Crystals", Jpn J. Appl. Phys., The Japan Society of Applied Physics, vol. 39, Part 1, No. 11, pp. 6288–6289, Nov. 2000, no date.

Chelnokov, A. et al., "Light Controllable Detect Modes in Three–Dimensional Photonic Crystal", Electronics Letters, vol. 34, No. 20, pp. 1965–1697, Oct. 1998, no date.

* cited by examiner

METHOD OF VARYING OPTICAL PROPERTIES OF PHOTONIC CRYSTALS ON FAST TIME SCALES USING ENERGY PULSES

FIELD OF THE INVENTION

The present invention relates to a method and devices for varying the optical properties of photonic crystals on very short time scales, and more particularly the invention relates to free carrier induced switching of the optical properties of photonic crystals for controlling the propagation of light in photonic crystals and semiconductors.

BACKGROUND OF THE INVENTION

Photonic crystals are periodic dielectric materials which continue to generate considerable interest because of their ability to offer novel ways to control the flow of light, see E. Yablonovitch, *Phys. Rev. Lett.*, 58, 2059 (1987) and S. John, *Phys. Rev. Left.*, 58 2486 (1987). Many of the unusual properties of photonic crystals are based on the existence of a partial or complete photonic band gap, a natural consequence of the material's underlying periodicity. This new class of optical materials provides the basic building blocks for a whole new generation of passive and active optical devices. For example, photonic crystals have found application in high efficiency microlasers (O. Painter et al., *Science* 284,1819 (1999)), waveguides (E. Chow, S. Y. Lin, J. R. Wendt, S. G. Johnson and J. D. Joannopoulos, *Opt. Lett.* 26, 286 (2001)), couplers (S. Noda, A. Chutinan and M. Imada, *Nature* 407, 608 (2000)) and new types of optical fibers (R. F. Cregan et al., *Science* 285, 1537 (1999)).

The range of devices based on photonic crystals could be enlarged in scope if they could be tuned on very short timescales. Although switching in dielectric stacks (one-dimensional photonic crystals) has been studied for over two decades (see T. G. Brown and B. J. Eggleton, *Opt. Lett.* 3, 385 (1998)), only a few theoretical studies of switching in higher-dimensional photonic crystals have been reported to date. Such crystals are unique in their ability to control the propagation of light in two or three dimensions, potentially enabling ultrafast integrated optical circuits for optical packet switching and optical computing.

Tuning of 2-D and 3-D photonic crystals has been demonstrated via infiltrated liquid crystals as disclosed in S. W. Leonard et al. *Phys. Rev. B*, 61, R2389 (2000) and K. Yoshino et al. *Jpn. J. Appl. Phys.* 38, L961 (1999), but the molecular reorientation responsible for changes in the refractive index typically occurs on a millisecond timescale. Much faster switching can only be achieved using electronic processes. Ultrafast changes in the refractive index can occur via non-resonant processes such as the optical Kerr effect, or resonant processes in which free electrons and holes are created as disclosed in M. I. Gallant and H. M. van Driel, *Phys. Rev. B* 26, 2133 (1982). The former effect can induce index changes which follow the light pulse, but requires high light intensities. The latter process may be more practical in that it requires substantially lower pump intensity and can still lead to induced changes limited by the pulse width. Relaxation is limited by the carrier recombination time, which can be as short as a picosecond in suitably designed materials, see F. E. Doany, D. Grischkowsky and C. Chi, *Appl. Phys. Lett.*, 50, 469 (1987) and F. W. Smith et al. *Appl. Phys. Lett.*, 54, 890 (1989). Free carriers generated by two-photon absorption have been used to change the optical properties of 1-D Si/SiO system as disclosed in A. Hache and M. Bourgeosi, *Appl. Phys. Lett.*, 77, 4089 (2000), although the induced transmission changes are <0.5% and were measured only at one wavelength.

Recently, P. Halevi and F. Ramos-Mendieta, *Phys. Rev. Lett.* 85, 1875 (2000) have theoretically shown how thermally activated carriers can tune two-dimensional photonic crystals fabricated with a narrow gap semiconductor (InSb). S. Susa, *Jpn. J. Appl. Phys.* 39, 6288 (2000) has also theoretically studied how the continuous optical injection of free carriers can shift the band edge of a two-dimensional photonic crystal for moderate pumping intensities. Experimentally, A. Chelnikov et al., *Electron. Lett.* 34, 1965 (1998) were able to show how free carriers could also control defect mode absorption in a 3-D silicon crystal with a photonic gap in the submillimeter range near 250 GHz.

It would be very advantageous to provide a method for modulating the optical properties of photonic crystals on much shorter time scales for ultrafast control of the propagation of light in photonic crystals. Such a method could be readily adapted to many applications broadly based in those areas of information technology and information handling based on the use of light beams in either all-optical or hybrid (electronic/optical) integrated circuits. As an example, such ultrafast control of light propagation in photonic crystals would enable the production of a large range of dynamic, wavelength tunable photonic crystal-based devices. Particularly, presently available commercial optical switches are based on pure mechanical movements, micro-mechanical movements (MEMS) or optically birefringent materials such as liquid crystals. All three types enable switching times in the microsecond ($\mu s$) to millisecond (ms) regions, but do not reach the very short switching times needed as discussed above. To achieve these very short switching times, at present only optical switching can be used which would be achievable using photonic crystal that could be tuned on ultrafast time scales. Another advantage of such a capability would be the ability to perform rapid switching of wavelengths in high-density small form factor optical photonic integrated circuits.

SUMMARY OF THE INVENTION

It is an object of the present invention to provide a method of changing or altering the optical properties of photonic crystals for control of the propagation of light in photonic crystals on time scales from milliseconds to femtoseconds.

Accordingly, the present invention provides a method for ultrafast, free carrier induced modulation of the optical properties of photonic crystals to provide control of optical properties such as bandgaps, stop-gaps, as well as dispersion curves associated with light waves outside the bandgap so that group velocities and other properties which will influence the polarization, amplitude, pulse width and time of transit of a pulse can be controlled.

In one embodiment, the method of the present invention uses generation of free carriers in the conduction band of a semiconductor by optical excitation using laser pulses with pulse widths of the order of femtoseconds which results in a change in the effective refractive index of the semiconductor. If the semiconductor is a constituent of a photonic crystal, the change in effective refractive index leads to a change in the Bragg reflection of the photonic crystal. The dispersion relation and the photonic bandgap will shift to other frequencies. This results in changes in the reflection and transmission properties of the photonic crystal. Since the creation of free carriers by absorption of light is extremely fast, the changes in the reflectivity occur in the sub-picosecond time scale. This ultra-fast change in the reflectivity and transmissivity is used to realize an opto-optical switch. The on-time of the switch can be adjusted by the material properties.

In one aspect of the invention there is provided a method for varying optical properties of a photonic crystal, the photonic crystal having at least one semiconductor constituent with an effective refractive index, comprising:

directing a pulsed energy beam onto a photonic crystal with the pulsed energy beam having pulses with temporal pulse widths in a selected range of times and having sufficient energy to generate free carriers in said semiconductor constituent to produce variations in the effective refractive index of the semiconductor thereby varying optical properties of said photonic crystal on a time scale of said temporal pulse widths.

In another aspect of the invention there is provided a method for varying optical properties of a photonic crystal on femtosecond time scales, the photonic crystal having at least one semiconductor constituent with an effective refractive index, comprising:

directing a pulsed energy beam onto a photonic crystal with the pulsed energy beam having pulses with femtosecond temporal pulse widths and having sufficient energy to generate free carriers in a conduction band of said semiconductor constituent causing variations in the effective refractive index of the semiconductor thereby varying the optical properties of said photonic crystal on femtosecond time scales.

The present invention also provides a photonic switching device, comprising:

a photonic crystal having at least one semiconductor constituent with an effective refractive index which determines propagation characteristics of light beams propagating in said photonic crystal;

light coupling means for coupling at least one light beam into the photonic crystal;

energy source means for producing a pulsed energy beam having pulses with temporal pulse widths in a selected range of times and having sufficient energy to generate free carriers in said semiconductor constituent, and optical directing means for directing said pulsed energy beam onto said photonic crystal, whereby when free carriers are generated in said semiconductor by said pulsed energy beam, variations in the effective refractive index of the semiconductor are induced which alter the propagation characteristics of the light beam as it propagates through said photonic crystal on time scales comparable to said temporal pulse widths.

In another aspect of the present invention, there is provided a method for varying optical properties of a dielectric material comprising at least a semiconductor constituent, the at least a semiconductor constituent having an effective refractive index, comprising:

directing a selectively patterned pulsed energy beam onto said dielectric material with the pulsed energy beam having pulses with temporal pulse widths in a selected range of times and having sufficient energy to generate a selected 1, 2 or 3-dimensional pattern of free carriers in a conduction band of said semiconductor constituent for producing variations in the effective refractive index of the semiconductor constituent thereby varying optical properties of said dielectric material on a time scale of said temporal pulse widths.

BRIEF DESCRIPTION OF THE DRAWNGS

The invention will now be described, by way of non-limiting examples only, reference being had to the accompanying drawings, in which.

or transmitted through the waveguide (8-2) depending on the waveguide pattern of free carriers generated in the crystal with the phase shift mask.

DETEAILED DESCRIPTION OF THE INVENTION

Broadly, the present invention provides a method for ultrafast, free carrier induced modulation of the optical properties of photonic crystals to provide control on time scales of optical properties of the photonic crystal such as bandgaps, stop-gaps, as well as dispersion curves associated with light waves outside the bandgap so that group velocities and other properties which will influence the polarization, amplitude, pulse width and time of transit of a light beam in the photonic crystal can be controlled.

More particularly, the method of controlling the optical properties of a photonic crystal relies on the crystal having a photoconductor or semiconductor (the term semiconductor as used herein also means photoconductor) constituent in which the generation of free carriers in the conduction band of the semiconductor (or photoconductor) material results in a change in the effective refractive index of the material. The change in effective refractive index leads to a change in the Bragg reflection of the photonic crystal so that the dispersion relation and the photonic bandgap shift to other frequencies. This results in changes in the reflection and transmission properties of the photonic crystal. A preferred method of generating the free carriers is by optical pumping. Since the creation of free carriers by absorption of light is extremely fast, the changes in the reflectivity occur in the sub-picosecond time scale. This ultra-fast change in the reflectivity and transmissivity to alter the optical properties of the photonic crystal may be used to realize various dynamic optical based devices including but not limited to switching devices.

Figure 1A:
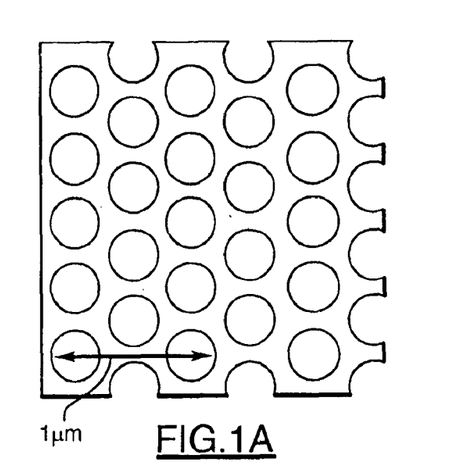
FIG. 1 shows a scanning electron microscope image of two-dimensional photonic crystal with lattice pitch of 500 nm where the sample has a height of 100 $\mu$m and a radius to pitch ratio of r/a=0.411, and the inset shows the first Brillouin zone of triangular lattice.
Figure 1B:
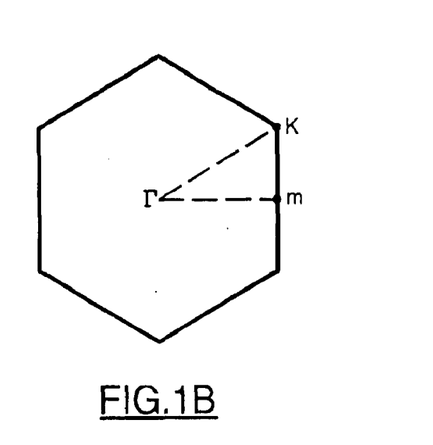

The method of the present invention will now be illustrated by first providing a calculation showing the effect of injection of electron-hole pairs into the photonic crystal and the dependence of the photonic band structure of the photonic crystal on plasma frequency. The photonic crystal used in this example comprises a macroporous silicon photonic crystal fabricated using the techniques disclosed in U. Gruning, V. Lehmann, S. Otow, and K. Busch, *Appl. Phys. Lett.* 68, 747 (1996), A. Birner, R. B. Wehrspohn, U. Gosele, and K. Busch, *Adv. Mat.*, 13, 377 (2001), and J. Schilling et al., *Opt. Mater.* 17, 7 2001 and U.S. Pat. No. 4,874,484). The samples have a triangular lattice of air pores in silicon, with a pitch of 500 nm and a pore radius of 206 nm. The pores extend 100 μm in depth and the sample is cleaved perpendicular to the so-called r-M direction, as shown in FIG. 1. For this direction, a stop-gap occurs from 1.9 to 2.3 μm. The injection of electron-hole pairs in a semiconductor is known to alter both the refractive index and absorption coefficient via a Drude contribution to the dielectric function, see M. I. Gallant and H. M. van Driel, *Phys. Rev. B* 26, 2133 (1982). In the absence of significant absorption, the dielectric function can be described as $\epsilon(\omega)=\epsilon_b-\omega_p^2/\omega^2$, where $\omega_p=(Ne^2/\epsilon_o m^*)^{1/2}$ is the plasma frequency, N is the density of electron-hole pairs, $\epsilon_b$ is the dielectric constant of quiescent silicon, m* is the reduced effective mass, e is the electron charge and ω is the probe frequency. In this example, in which probe light near 1.9 μm is used and carrier densities are less than $2\times10^{19}$ cm$^{-3}$, the imaginary terms in the dielectric function arising from free-carrier absorption and intervalence band absorption are very small. Using an effective mass (O. Madelung, Semiconductors—Basic Data, (New York Springer, 1996), p. 11) of m*=0.16 $m_o$ (where $m_o$ is the electron mass), a momentum relaxation time of τ~100 fs, and an intervalence band cross section of $10^{-17}$ cm$^2$, (L. M. Lambert, *Phys. Stat. Sol.* (a) 11, 461 (1972)) the magnitude of the free-carrier induced imaginary term in the dielectric function is approximately an order of magnitude smaller than that of the real term, see M. I. Gallant and H. M. van Driel, *Phys. Rev. B* 26, 2133 (1982).

To illustrate the effect of free carriers on the properties of the silicon-air photonic crystal, the dependence of the photonic band structure on the plasma frequency was calculated. The Drude form of the dielectric function allows a plane-wave expansion of Maxwell's equations to be cast in the form of a standard eigenvalue equation (see V. Kuzmiak, A. A. Maradudin, and F. Pincemin, *Phys. Rev. B* 50, 16835 (1994). The calculations were performed for the photonic crystal structure with plasma frequencies in the range $0<\omega_p a/2\pi c<1$ and it was found that 400 plane waves provided sufficient convergence.

Figure 2:
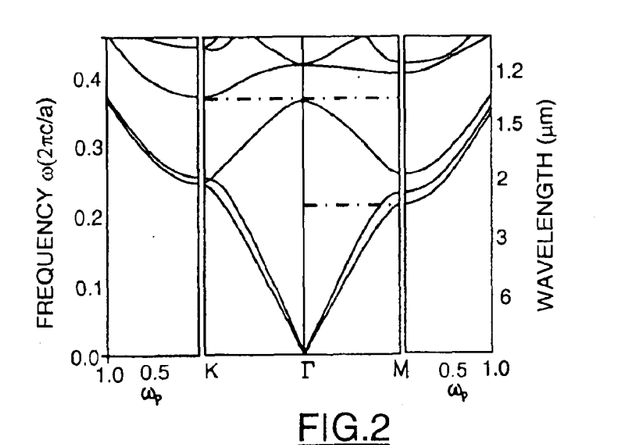
FIG. 2 shows the band structure of two-dimensional photonic crystal and dependence of band-edge frequencies on the plasma frequency $\omega_p$ assuming a lossless dielectric function with the radius to pitch ratio of 0.411 and the wavelength scale is calculated assuming a pitch of 500 nm, the plasma frequency is given in units of $2\pi c/a$, also shown are the complete two-dimensional band gap (blue region) and the stop band investigated in the experiment (shaded region)

The photonic band structure for the E- and H-polarized bands (electric field polarized parallel and perpendicular to pore axis, respectively) and the dependence of the band-edge frequencies on the plasma frequency is shown in FIG. 2. All band-edge frequencies are blue-shifted with increasing plasma frequency. The magnitude of the band-edge shift depends on both the mode frequency and the concentration of the mode energy in the silicon. The two-dimensional photonic band gap near 1.4 μm (indicated by the dashed line in FIG. 2) closes completely for plasma frequencies greater than $\omega_p=0.57\times2\pi c/a$ (corresponding to N=$2.3\times10^{20}$ cm$^{-3}$ for this photonic material).

Figure 3:
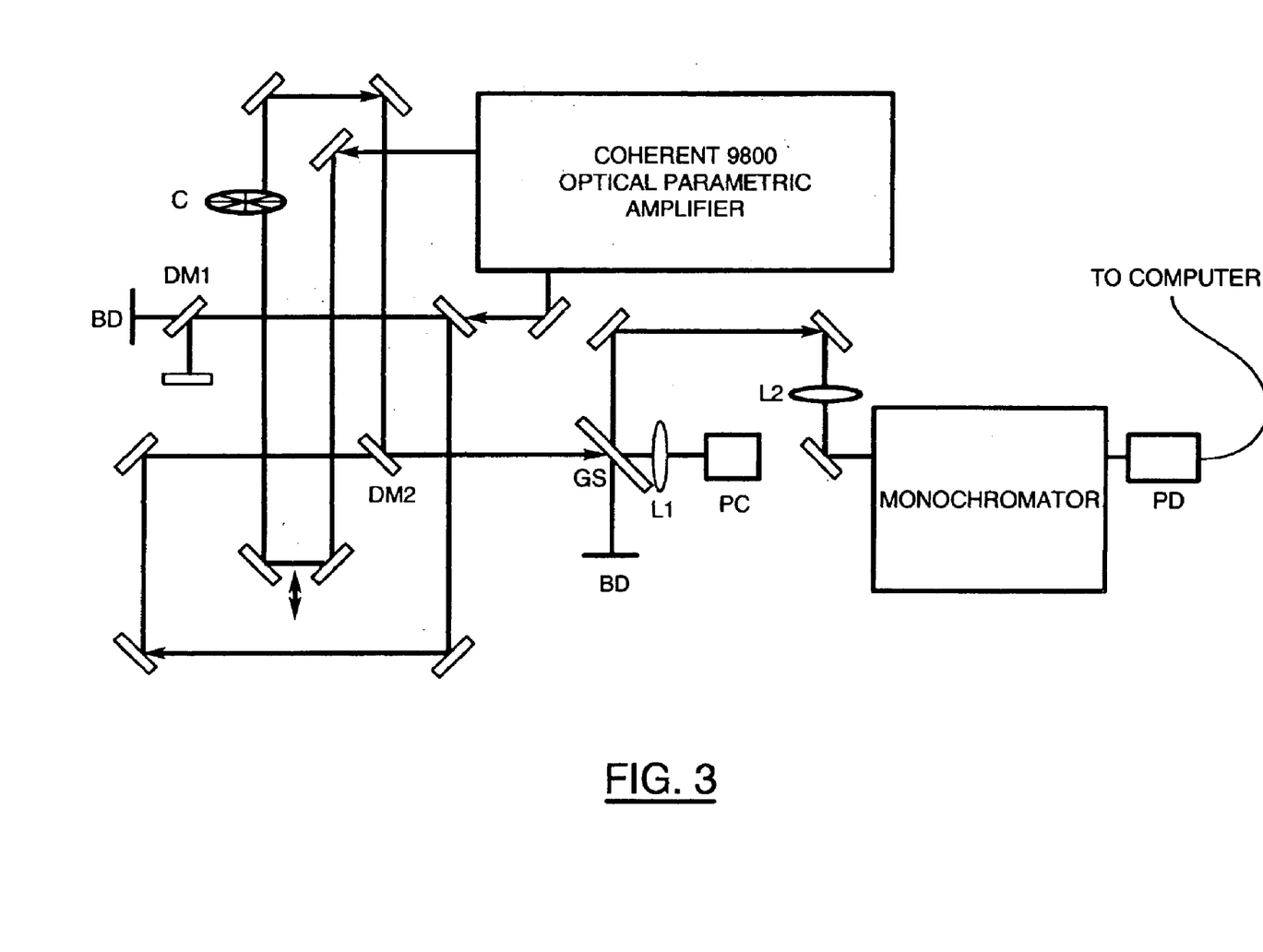
FIG. 3 shows a block diagram of an apparatus for optically pulsing a photonic crystal (PC) and associated detector system.

To observe the effects of carriers on the photonic band structure, ultrafast pump and probe experiments of the above-described composite silicon/air photonic crystal were carried out. FIG. 3 shows a block diagram of this system for pumping and probing photonic crystal (PC) using the pump source and detector system. The idler beam with a wavelength of λ=1.9 μm was produced using a Coherent 9800 Ti:sapphire regenerative parametric amplifier with a pulse repetition rate of 250 kHz and was focused onto the photonic crystal (PC) sample and the reflectivity was measured as a function of the power and relative delay of a collinear pump beam having a wavelength of λ=800 nm, dumped by the parametric amplifier. The system was configured to produce collinearly propagating E-polarized probe pulses near 1.9 μm (resonant with the high-frequency side of the first band gap) and H-polarized pump pulses at the aforementioned wavelength of 800 nm, each with a pulse width of approximately 300 fs. In the block diagram of FIG. 3, BD represents the beam dump, DM1 is a dielectric mirror used to spatially separate signal and idler, C is an optical chopper, DM2 is a mirror used to inject pump, GS is a glass slide, L1, L2 are lenses, and PD is a pyroelectric detector. Various optics were used (not shown) to increase and decrease spot sizes of the probe and pump beams, respectively, in order to achieve desired spatial overlap of collinear beams on sample.

The probe was focused to a spot size of 30 μm, within the 90 μm spot size of the pump beam. The reflectivity spectrum was measured with a monochromator and a pyroelectric detector. A variable delay in the pump path allowed for the probe reflectivity to be measured as a function of time delay.

Figure 4:
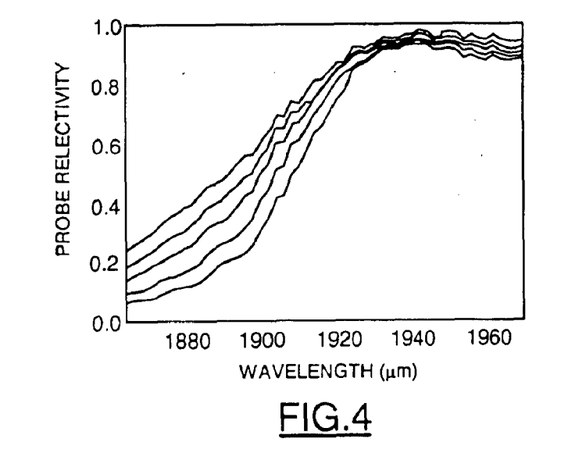
FIG. 4 shows E-polarized reflectivity of photonic crystal in Γ-M direction in the vicinity of the high-frequency fundamental band edge, and its dependence on pump-light fluence.

The probe reflection spectrum and its dependence on the pump pulse fluence is shown in FIG. 4 (measured with the probe delayed 13.5 ps from the pump, well beyond initial reflectivity transients). The unpumped sample reflectivity has a maximum value of 0.97 in the band gap, indicating high surface quality. The spectra are clearly blue-shifted with increasing pump fluence, consistent with the Drude model discussed above. A maximum shift of 29±1 nm (measured at a reflectivity of 0.3) is observed for a pump fluence of 2.1±0.4 mJ/cm$^2$. This shift spans nearly 10% of the unpumped crystal stop band. The steepness of the band edge facilitates the observation of large differential reflectivities, in excess of 250% for the maximum pump fluence, although this steepness changes with fluence because of spatial inhomogeneity in the plasma with depth (see below). The reflectivity within the stopgap remains above 0.90 at the maximum pump fluence, indicating that absorption has a negligible effect on reflectivity.

Figure 5:
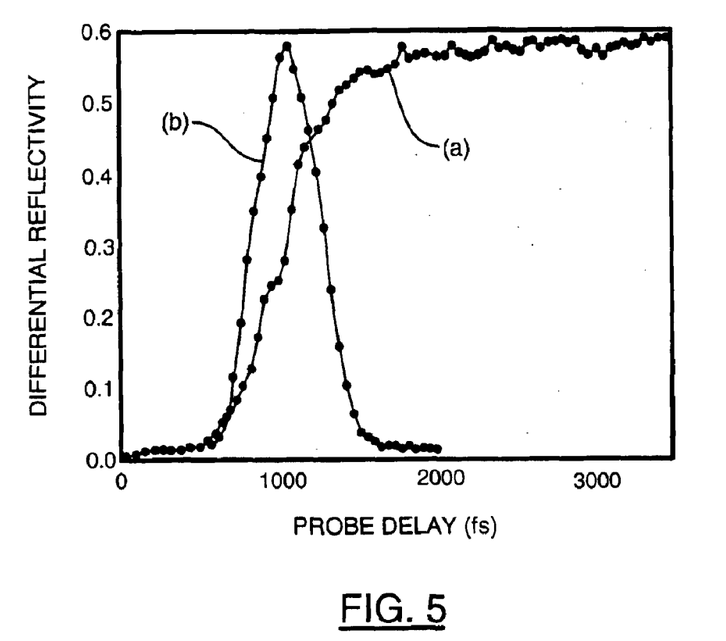
FIG. 5 is a plot of differential reflectivity versus probe delay (fs) showing the dependence of differential reflectivity ($\Delta R/R$) on probe delay for $\lambda$=1900 nm and a pump fluence of 1.3 mJcm$^{-2}$ (curve (a)), also plotted is pump and probe cross-correlation (curve (b), arbitrary units)

The temporal evolution of the band-edge shift was observed by measuring the reflectivity of the photonic crystal while varying the delay between the pump and the probe pulses. The observed dependence is shown in FIG. 5, where the differential reflectivity is plotted as function of the probe delay for a pump pulse fluence of 1.3 mJ/cm$^2$ at a probe wavelength of $\lambda$=1900 nm. The differential reflectivity increases with a rise time of approximately 400 fs, consistent with pump and probe pulse widths. The subsequent plateau was observed to be constant over the 70 ps delay range of the experiment. The constant plateau is consistent with the >1 ns expected carrier recombination lifetime of bulk silicon, governed by Auger recombination (A. Haug and W. Schmid, *Solid State Electr.*, 25, 665 (1982)) and surface recombination. Using an Auger coefficient of 1.9×10$^{-31}$ for silicon (J. Dziewior and W. Schmid, *Appl. Phys. Lett.*, 31, 346 (1977)), the minimum recombination lifetime corresponding to the maximum density of 2.0×10$^{19}$ cm$^{-3}$ is predicted to be approximately 13 ns, consistent with the observed time-independent plateau in the picosecond regime.

The recombination lifetime can be reduced to approximately a picosecond via the introduction of radiation-induced defects or other non-radiative traps (e.g. as was done with other materials using ion-implantation of oxygen in silicon on sapphire, see F. E. Doany, D. Grischkowsky and C. Chi, *Appl. Phys. Lett.*, 50, 469 (1987), and low-temperature grown (GaAs) F. W. Smith et al. *Appl. Phys. Lett.*, 54, 890 (1989).

Figure 6:
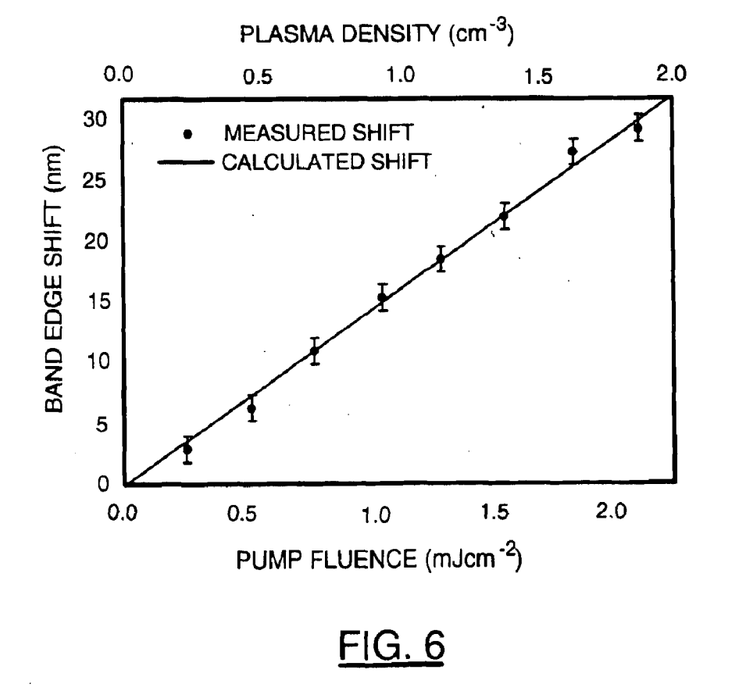
FIG. 6 shows a plot of measured dependence of band edge blueshift on pump fluence at R=0.3, and calculated dependence of band edge blueshift on plasma density, the fluence values have a relative error of ±20% due to uncertainties in the measured spot size of the pump.

As shown in FIG. 6, the observed dependence of the band-edge shift on the pump fluence fits very well with the linear behaviour predicted by the plane wave model. By fitting the observed shift with the calculated shift, we obtained a relationship between the measured pump fluence and the excited carrier density. The inferred density fell in the range 0.2<N<1.9×10$^{19}$ cm$^{-3}$ for the pump fluences used in the experiment. Using the fitted relationship between the density and the pump fluence, the effective pump absorption depth can be calculated via the relation N=F(1−R)/E$_p$L where F is the pump fluence, R is the pump reflectivity (measured to be 0.56), E$_p$ is the pump photon energy, and L is the effective pump absorption depth. This relation gives L=2.0±0.4 μm which is five times smaller than that of bulk silicon (W. C. Dash and R. Newton, *Phys. Rev.* 99, 1151 (1955)). The shallower absorption depth is attributed to a lower group velocity of the photonic band at 800 nm compared to that of bulk Si. The pump energy is therefore absorbed within approximately 3 crystal rows (one crystal row in the r-M direction has a length of sqrt(3)a=866 nm), leading to a carrier density that is spatially inhomogeneous.

It is noted that this depth could be extended by pumping with a wavelength closer to the electronic band-edge of silicon, where the pump absorption depth is much larger.

The spatially inhomogeneous plasma, and the resulting depth-dependence of the photonic band edge, accounts for important features of the reflectivity spectrum. When the crystal is not pumped, light with a wavelength below approximately 1880 nm (significantly below the band edge in FIG. 4) is partially reflected via the impedance mismatch at the crystal surface. Although most of the light couples to a propagating mode and probes the entire crystal, the reflected light only probes the surface layer of the crystal. However, when the wavelength is inside the stop band ($\lambda$>1940 nm), all of the light is reflected due to the coherent superposition of an infinite number of backscattered waves from deep within the crystal. Therefore, as the wavelength increases toward the band edge, the reflection mechanism changes from impedance mismatch to Bragg scattering, and the reflected light probes deeper regions of the crystal.

The consequence of the inhomogeneously pumped crystal is that the short-wavelength reflectivity probes the highly pumped surface region, resulting in a large spectral shift. However, as the wavelength increases and crosses the blue-shifted band edge of the pumped crystal, the reflected light penetrates deeper into the crystal. In fact, some of the deeply penetrating waves couple to the propagating modes of the weakly-pumped part of the crystal, resulting in a lower reflectivity and a smaller shift. This effect is clearly seen in FIG. 4, where the shift is large for short wavelengths but decreases as the wavelength increases toward the band edge. This observation validates measuring the blue-shift near the bottom of the peak, where the efficiently-pumped surface layers are being probed. The qualitative explanation given above was theoretically verified using a one-dimensional transfer-matrix model of the inhomogeneously-pumped photonic crystal. The results correctly reproduce the observed spectral shape for an absorption depth of three layers, thus confirming the model presented above.

The present method has been exemplified using optical production of electron-hole pairs in the semiconductor component of the photonic crystal by directing a pulsed light beam with pulse durations on the order of femtoseconds onto the photonic crystal to effect changes in the optical properties. Free carrier injection using short duration optical pulses is preferred in the nanosecond to femtosecond time regime. However, the present invention is not restricted to using optical excitation with pulses having pulse durations on femtosecond time scales. Directing a pulsed energy beam onto a photonic crystal with the pulsed energy beam having pulses preferably with temporal pulse widths in the range of milliseconds to femtoseconds (or shorter once they become available) and having sufficient energy to generate free carriers in a conduction band of the semiconductor constituent of the photonic crystal will induce variations in the effective refractive index of the semiconductor thereby varying the optical properties of the photonic crystal on a time scale of the temporal pulse widths.

Injection of carriers using thermal or electrical excitation methods may also be employed for varying the effective refractive index albeit on longer time scales than achievable with optical pulsing. For example, electrical injection of free carriers via p-n junctions, n+/n junctions or metal junctions may be achieved on nanosecond or longer time scales using electrical pulses applied to the semiconductor. Alternatively, thermal injection of free carriers may be achieved by optical heating, electrical induced heating to effect a change in the optical properties of the photonic crystal. Simply heating the photonic crystal up and down in rapid thermal annealing using a pulsed or chopped lamp or heat chuck would be very efficient for low-bandgap semiconductors such as InAs. Additionally, arrayed waveguide gratings are adjusted by temperature, and while pulsed heating is slow, it can be used to adjust very resonant structures such as for example an add-drop multiplexer.

It will also be understood that while the free carriers are typically generated by excitation across the bandgap separating the conduction and valence bands thereby leaving free holes in the valence band and free electrons in the conduction band, other mechanisms of free carrier generation may be used. For example, the semiconductor may have impurity levels below the conduction band so that upon directing a suitable energy pulse, thermal, electrical or optical pulse with a sub-bandgap energy, electrons are excited into the conduction band from the impurity states thus producing the free carriers. Similarly, impurity acceptor levels may be located above the valence band which can accept electrons from the valence band leaving behind free holes in the valence band so again sub-bandgap energy pulses may be used to produce the free carriers.

Figure 7:
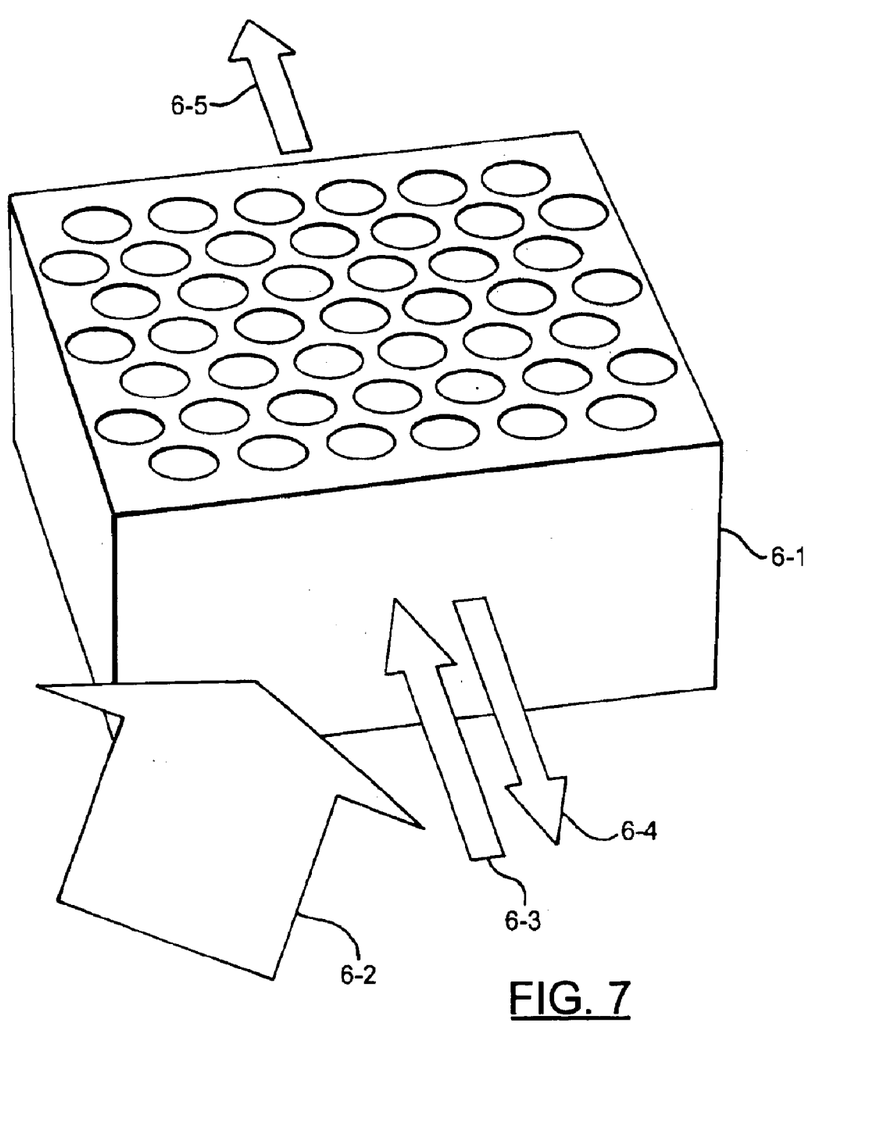
FIG. 7 shows a perspective view of a photonic crystal (6-1) comprised of a semiconductor/air composite material showing a pump beam (6-2), a light beam incident on one side of the crystal (6-3) and light being reflected back (6-4) or transmitted through the crystal (6-5)

The present method may be used in 1-, 2- and 3-dimensional photonic crystals to produce optical switching. Depending on the amplitude of the pump light, the bandgap of the photonic crystal changes and the bandwidth of the switch can be varied in a controlled and predictable manner. The device can work either as default in reflection mode or transmission mode as shown in FIG. 7 which shows a perspective view of a photonic crystal (6-1) comprised of a semiconductor/air composite material showing a pump beam (6-2), a light beam incident on one side of the crystal (6-3) and light being reflected back (6-4) or transmitted through the crystal (6-5).

The on-time of the switch can be adjusted by the material properties. For example, by introducing suitable defects into the semiconductor constituent the on-time of the optical switch could be adjusted. This may be achieved by diffusing, growing-in or implanting electrically-active bulk defects in the material. For example, these defects may comprise gold or nickel dopants added to accurately control the excess carrier lifetime.

Another embodiment of the photonic crystal based optical switch would comprise the photonic crystal having suitable recombination centers incorporated into the surface of the semiconductor. For example, with silicon as the semiconductor material, a subatomic surface layer of nickel could be incorporated in order to adjust the on-time of the switch. Implantation or epitaxial growth of effective defects in the semiconductor material, for example GaAs or InP, may be used to control the on-time of the switch.

The present invention has been exemplified by demonstrating, for the first time, the ability to vary optical properties of the silicon/air photonic crystal characterized by a complete photonic bandgap by varying the effective refractive index of the semiconductor on very fast time scales. However, it will be understood that the method is generally applicable to varying any of the optical properties of a photonic crystal that can be modulated by varying the effective refractive index, whether or not the photonic crystal has a full photonic bandgap.

Similarly, while the present invention has been illustrated using 2-D, photonic crystals based on air-silicon composite materials, those skilled in the art will appreciate that the present invention more broadly permits one to alter the optical properties of 1-D, 2-D and 3-D semiconductor photonic crystals, on ultrafast time scales. Free carrier injection in the photonic crystal can now be used to alter the properties of stop-gaps, band gaps as well as dispersion curves associated with light waves outside the gap so that group velocities and other properties which will influence the polarization, amplitude, pulse width and time of transit of a pulse through the photonic crystal can be controlled.

A photonic switch constructed using the method disclosed herein may be based on switching defect modes in 2D thin-film photonic crystals. 2D photonic crystals offer a means of optically or electronically injecting free-carriers from the out-of-plane direction. For example, semiconductor homo- or heterojunctions may be used to inject carriers into the volume of the thin film photonic crystal in which the optical field propagates.

Figure 8:
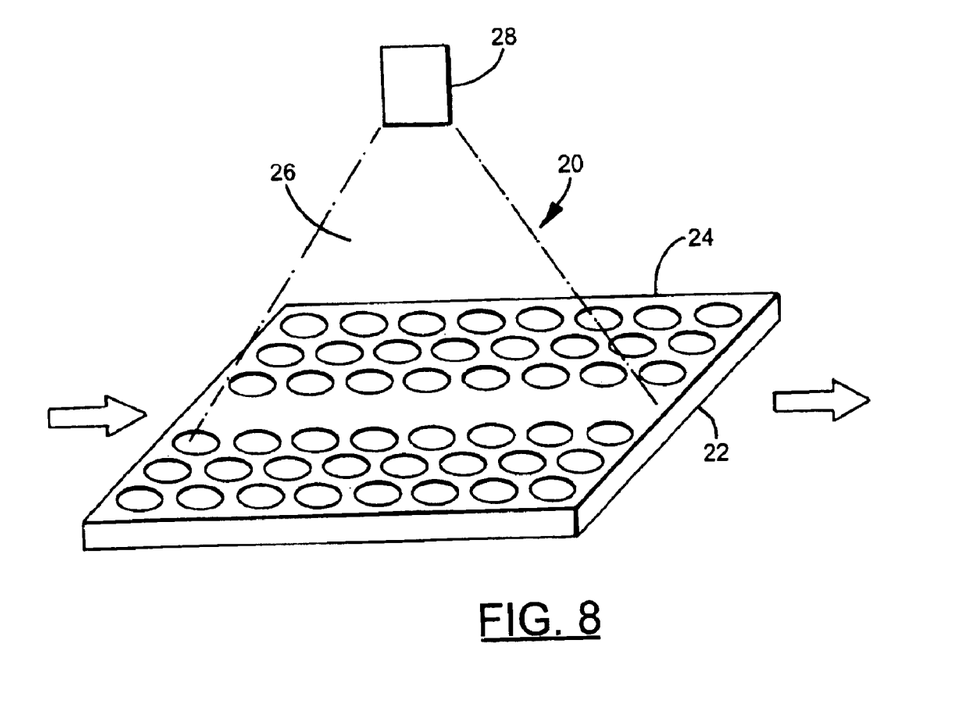
FIG. 8 shows a thin-film two-dimensional photonic crystal containing a linear waveguide in which the crystal is uniformly illuminated from the out-of-plane direction via an external pump source, modifying the transmissive properties of the waveguide.
Figure 9:
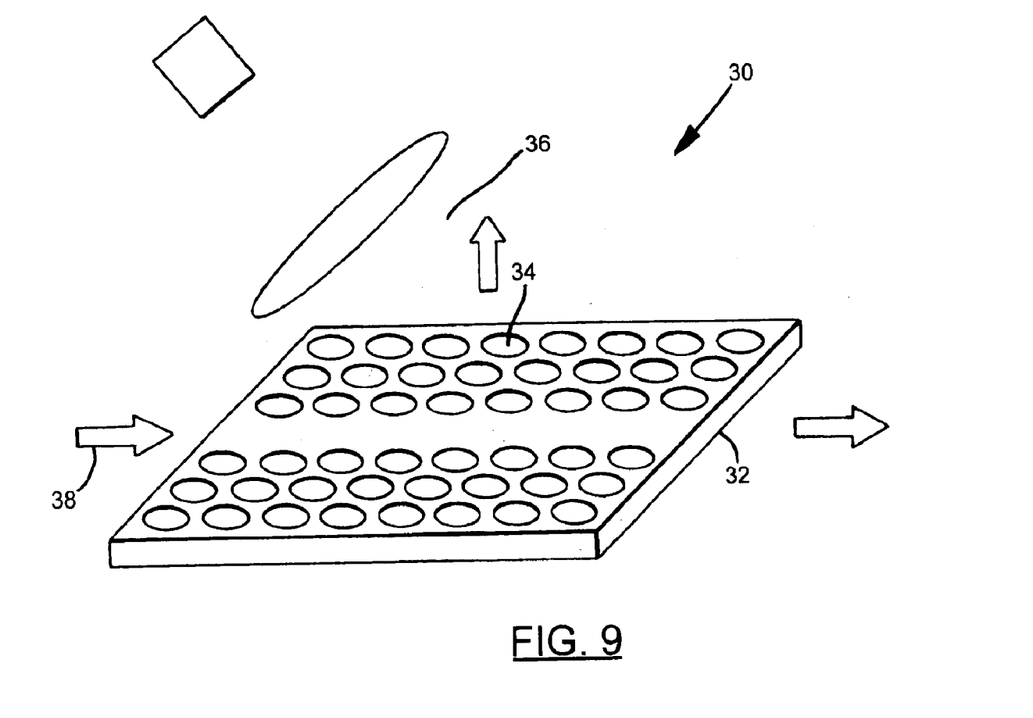
FIG. 9 shows a thin-film two-dimensional photonic crystal containing a linear waveguide and a single defect resonator adjacent to the waveguide under illumination via a focused pump beam (from an external out-of-plane source), the resonant frequency of the defect equals that of the signal light in the waveguide and the defect then couples light from the waveguide into a direction perpendicular to the two-dimensional plane.

FIG. 8 shows a thin-film two-dimensional photonic crystal 20 containing a linear waveguide 22 defined along the length of the crystal between two arrays of holes 24. The crystal is uniformly illuminated with a pulsed light beam 26 from the out-of-plane direction via an external light pump source 28, modifying the transmissive properties of the waveguide. Alternatively, emission from optical sources located above or below the thin film plane can be focused onto the photonic crystal layer, and the absorption of this out-of-plane light by the photonic crystal can generate free-carriers. These methods can be used to produce either local or global index changes in the photonic crystal. For example, FIG. 9 shows a thin-film two-dimensional photonic crystal 30 containing a linear waveguide 32 and a single defect resonator 34 adjacent to the waveguide 32. Under illumination via the focused pump beam 36 (from an external out-of-plane source), the resonant frequency of the defect 34 equals that of the signal light 38 coupled into the waveguide 32. The defect then couples light from the waveguide into a direction perpendicular to the two-dimensional plane of the planar crystal.

In addition to resonators and waveguides as shown in FIGS. 8 and 9, the thin-film two-dimensional photonic crystal may include various integrated devices such as gratings, mirrors, lasers, amplifiers, limiters, attenuators, couplers, splitters, multiplexers, diffractive elements, polarizers, isolators, circulators, interferrometers and modulators incorporated therein, the properties of which may then be varied via the presence of free-carriers produced globally or locally by the pulsed energy source.

Dynamic defect modes can also be created via multi-beam pump interference or a mask. Tunable local refractive index changes may be induced using a phase mask or multi-beam interference.

The present invention has thus far dealt with the broad concept of changing the properties of pre-existing photonic crystals, locally or globally, via free-carrier injection. In another aspect of the present invention, the methods disclosed herein may be used to create, in-situ, virtual/transient/ induced photonic crystals in an otherwise bulk dielectric material (which is a photoconductor or semiconductor) via a spatially-periodic optical pump (or a spatially-periodic electrode configuration for electrical injection). The "bulk" medium may be optical waveguides into which carrier-induced transient Bragg gratings are written. This may for example be realized by shining light through a phase-shift mask, which creates an optical pattern in the dielectric material. The optical pattern creates a pattern of free carriers, which locally change the refractive index contrast and creates in-situ a photonic crystal. This could be, depending on the mask, a 1D, 2D or 3D photonic crystal.

Figure 10:
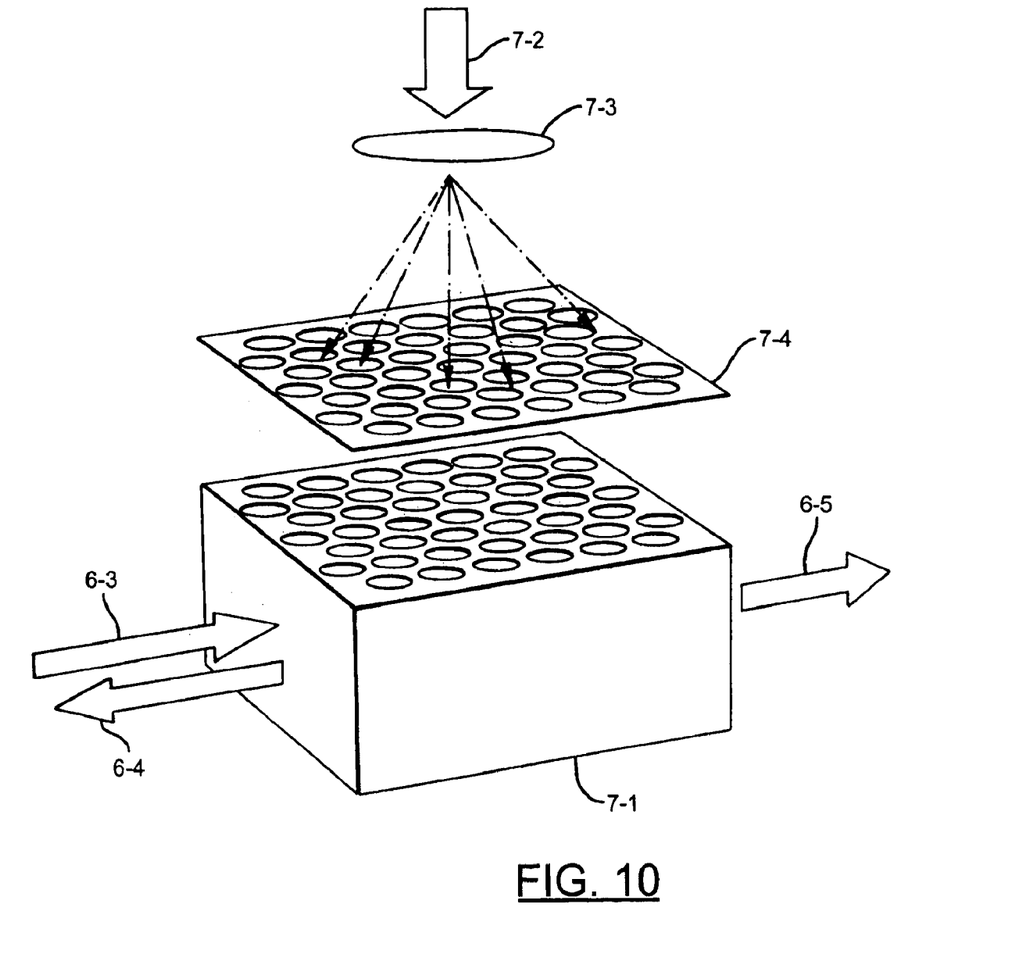
FIG. 10 shows a perspective view of the in-situ creation of photonic crystal comprised of a pure/bulk semiconductor material (7-1) being pumped with a laser beam (7-2) defocussed through a lens (7-3), passing a phase shift mask (7-4) for generating a photonic crystal pattern of free carriers. On one side of the crystal the incident light (6-3) might be either reflected back (6-4) or transmitted (6-5) through the crystal depending on the pattern of free carriers generated in the crystal with the phase shift mask.

FIG. 10 shows a perspective view of the in-situ creation of photonic crystal comprised of a pure/bulk semiconductor material (7-1) being pumped with a laser beam (7-2) defocussed through a lens (7-3), passing through a phase shift or amplitude mask (7-4) for generating a pattern of free carriers that defines a photonic crystal. On one side of the crystal the incident light (6-3) might be either reflected back (6-4) or transmitted (6-5) through the crystal depending on the pattern of free carriers generated in the crystal with the phase shift or amplitude mask. An advantage of using a phase shift mask over an amplitude mask is that a phase shift mask may be addressed electrically in order to change the pattern.

Figure 11:
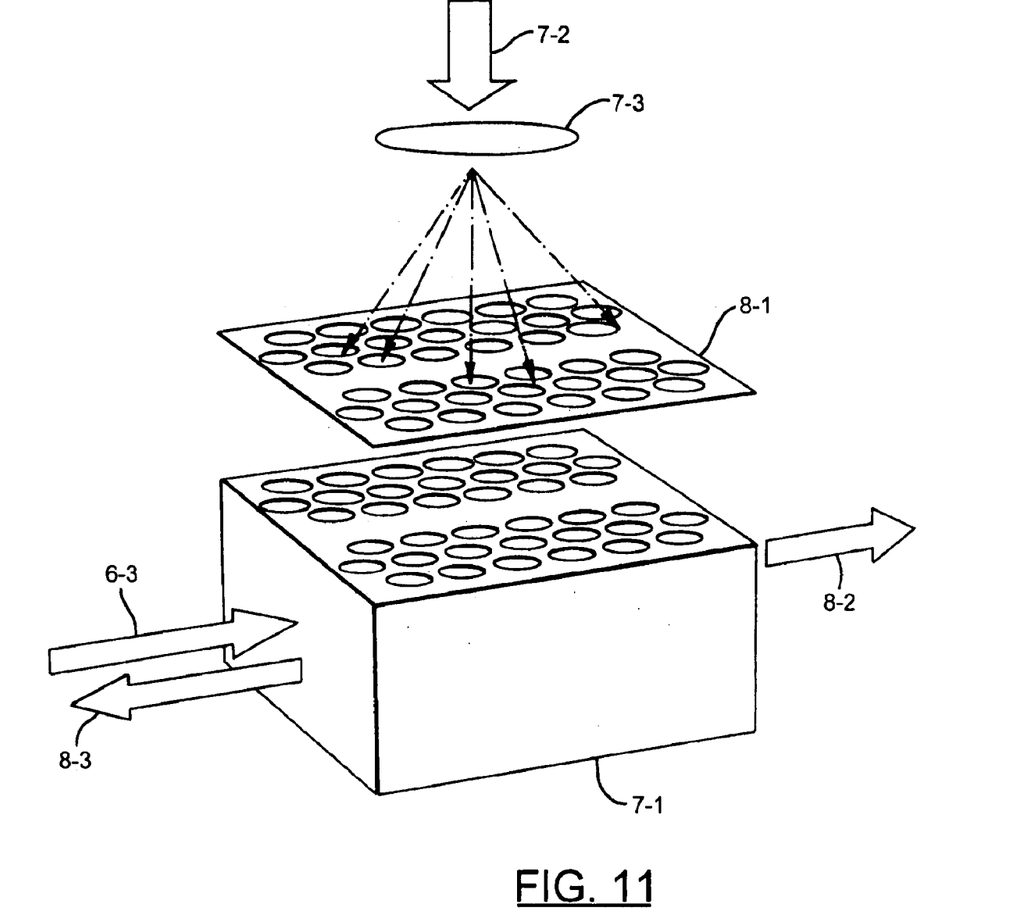
FIG. 11 shows a perspective view of the in-situ creation of photonic crystal defect waveguide comprised of a pure/bulk semiconductor material (7-1) being pumped with a laser beam (7-2) defocussed through a lens (7-3), passing a tunable phase shift mask (81) for controlling the propagation of a light beam through the crystal. On one side of the crystal the incident light (6-3) might be either reflected back (8-3)

In another application, the optical pattern can be used to produce optical circuits on the fast time scale consisting of for example waveguides, photonic defects or photonic crystals. This would allow the creation of an optically defined photonic component or even circuit which can be switched on the short-time scales. For example, FIG. 11 shows a perspective view of the in-situ creation of photonic crystal defect waveguide comprised of a pure/bulk semiconductor material (7-1) being pumped with a laser beam (7-2) defocussed through a lens (7-3), passing a tunable phase shift mask (8-1) for controlling the propagation of a light beam through the crystal. On one side of the crystal the incident light (6-3) might be either reflected back (8-3) or transmitted through the waveguide (8-2) depending on the waveguide pattern of free carriers generated in the crystal with the phase shift mask.

Figure 12:
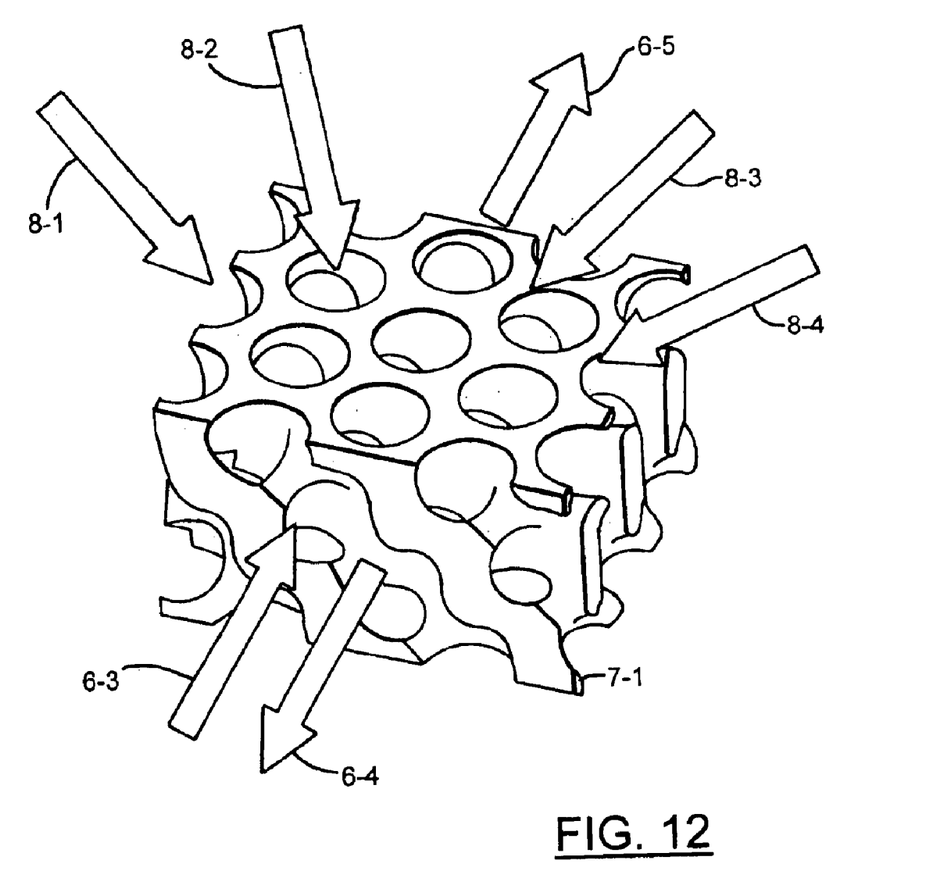
FIG. 12 shows a pure/bulk semiconductor (7-1) where a 3D pattern of free carriers is optically generated via 4-wave mixing (8-1 to 8-4). On one side of the crystal the incident light (6-3) might be either reflected back (6-4) or transmitted through the photonic crystals (6-5) depending on the waveguide pattern of free carriers generated in the crystal with the phase shift mask.

FIG. 12 shows a pure/bulk semiconductor (7-1) where a 3D pattern of free carriers is optically generated via 4-wave mixing (8-1 to 8-4). On one side of the crystal the incident light (6-3) might be either reflected back (6-4) or transmitted through the photonic crystals (6-5) depending on the waveguide pattern of free carriers generated in the crystal with the phase shift mask.

In summary, the present invention provides a method for fast switching of optical properties in photonic crystals using pulsed/modulated free-carrier injection. The results disclosed herein indicate that several types of photonic crystal devices can be designed in which free carriers are used to control reflection, transmission, absorption, gain, or phase. The use of modulated free carrier injection to control the properties of photonic crystals on fast time scales forms the basis for all-optical switching using photonic crystals. The present invention also provides a method of producing a virtual or temporary photonic crystal using free carrier injection into pure semiconductors, bulk or thin film, in which the carriers are generated in patterns which create a patterned refractive index contrast used to steer light beams in the semiconductor while it is being pulsed.

The methods disclosed herein may be used in numerous applications using photonic bandgap crystals such as optical switching. For example, in the telecommunications industry the method may be used for ultrafast photonic band-edge switching of photonic crystals near the telecommunication wavelength region. The present method can be used to alter the transmission amplitude, direction or velocity of optical beams and related effects in various types of switching applications. Significant advantages of optical switches based on photonic bandgap materials include a very high extinction ratio and the ability to carefully provide spectral or wavelength selectivity and ultra-dense optical integration. As disclosed above this switching behaviour can also be achieved with photoconducting or semiconducting dielectric non-photonic bandgap based materials also by inducing a variation in the refractive index using free carriers to produce ultrafast switches.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method for varying optical properties of a photonic crystal, the photonic crystal having at least one semiconductor constituent with an effective refractive index, comprising:

directing a pulsed energy beam onto a photonic crystal with the pulsed energy beam having pulses with temporal pulse widths in a selected range of times and having sufficient energy to generate free carriers in said semiconductor constituent to produce variations in the effective refractive index of the semiconductor constituent thereby varying optical properties of said photonic crystal on a time scale of said temporal pulse widths.

2. The method for varying optical properties of a photonic crystal according to claim 1 wherein said pulsed energy beam is a pulsed laser beam having a beam photon energy greater or equal to a bandgap energy between a valence band and conduction band of said semiconductor constituent, and wherein said pulsed laser beam has temporal pulse widths in a range from milliseconds to femtoseconds so that said free carriers are optically produced in said semiconductor constituent and wherein said effective refractive index is varied on a millisecond-to-femtosecond timescale.

3. The method for varying optical properties of a photonic crystal according to claim 1 wherein said pulsed energy beam is a pulsed laser beam having a beam photon energy sufficient to excite charge carriers into defect levels from a valence band or from defect levels into a conduction band, said defect levels being located between a valence band and a conduction band of said semiconductor constituent, and wherein said pulsed laser beam has temporal pulse widths in a range from milliseconds to femtoseconds so that said free carriers are optically produced in said semiconductor constituent and wherein said effective refractive index is varied on a millisecond-to-femtosecond timescale.

4. The method for varying optical properties of a photonic crystal according to claim 1 wherein said free carriers are electrically injected into said semiconductor constituent.

5. The method for varying optical properties of a photonic crystal according to claim 1 wherein said free carriers are thermally injected into said semiconductor constituent.

6. The method for varying optical properties of a photonic crystal according to claim 5 wherein said free carriers are thermally injected by heating said semiconductor constituent with a pulsed light source having an effective wavelength to thermally generate free carriers.

7. The method for varying optical properties of a photonic crystal according to claim 5 wherein said free carriers are thermally injected by applying a pulsed electric field to said semiconductor constituent thereby electrically heating said semiconductor constituent.

8. The method for varying optical properties of a photonic crystal according to claim 1 wherein said photonic crystal includes a complete photonic bandgap, and wherein said variation in the effective refractive index of the semiconductor varies the photonic bandgap energy of said photonic crystal.

9. The method for varying optical properties of a photonic crystal according to claim 1 wherein said semiconductor constituent includes a p-n junction, and wherein said free carriers are injected by applying a pulsed electrical potential to said p-n junction.

10. The method for varying optical properties of a photonic crystal according to claim 1 wherein said semiconductor constituent includes an n+/n junction, and wherein said free carriers are injected by applying a pulsed electrical potential to said n+/n junction.

11. The method for varying optical properties of a photonic crystal according to claim 1 wherein said semiconductor constituent includes a p+/p junction, and wherein said free carriers are injected by applying a pulsed electrical potential to said p+/p junction.

12. The method for varying optical properties of a photonic crystal according to claim 1 wherein said semiconductor constituent includes a metal-semiconductor junction, and wherein said free carriers are injected by applying a pulsed electrical potential to said metal-semiconductor junction.

13. The method for varying optical properties of a photonic crystal according to claim 1 wherein said semiconductor is doped with selected dopants that act as recombination centers for providing a selected mean recombination lifetime for the injected free carriers.

14. The method for varying optical properties of a photonic crystal according to claim 2 wherein said pulsed laser beam is focused through a phase shift or amplitude mask onto said photonic crystal, said mask having a pre-selected pattern for illuminating said photonic crystal with said pre-selected pattern whereby a selected pattern of free carriers is produced spatially across the photonic crystal that alters the effective refractive index with said pre-selected pattern.

15. The method for varying optical properties of a photonic crystal according to claim 14 wherein said phase shift mask is electrically tunable for controllably varying said pattern of free carriers.

16. The method for varying optical properties of a photonic crystal according to claim 1 wherein said variations in the effective refractive index of the semiconductor constituent induce variations of photonic bandgaps, stop-gaps, as well as dispersion curves associated with light beams propagating through said photonic crystal having wavelengths outside the bandgap so that group velocities and other properties which will influence wavelength content, polarization, amplitude, pulse width and time of transit of a pulse of said light beam propagating in said photonic crystal can be selectively controlled.

17. The method for varying optical properties of a photonic crystal according to claim 1 including optically coupling an information bearing light beam into said photonic crystal, and coupling said information bearing light beam into an optical device for analysing information contained therein after it exits said photonic crystal with said altered propagation characteristics.

18. The method for varying optical properties of a photonic crystal according to claim 1 including controlling a size of the pulsed energy beam hitting said photonic crystal for controlling a volume in said photonic crystal in which said optical properties are varied.

19. A method for varying optical properties of a photonic crystal on femtosecond time scales, the photonic crystal having at least one semiconductor constituent with an effective refractive index, comprising:
    directing a pulsed energy beam onto said photonic crystal with the pulsed energy beam having pulses with femtosecond temporal pulse widths and having sufficient energy to generate free carriers in a conduction band of said semiconductor constituent causing variations in the effective refractive index of the semiconductor thereby varying the optical properties of said photonic crystal on femtosecond time scales.

20. The method for varying optical properties of a photonic crystal according to claim 19 wherein said pulsed energy beam is a pulsed laser beam having a beam energy greater or equal to a bandgap energy between a valence band and conduction band of said semiconductor constituent, and wherein said pulsed laser beam has temporal pulse widths of the order of femtoseconds.

21. The method for varying optical properties of a photonic crystal according to claim 19 or 20 wherein said pulsed energy beam is a pulsed laser beam having a beam photon energy sufficient to excite charge carriers into defect levels from a valence band or from defect levels into a conduction band, said defect levels being located between the valence band and the conduction band of said semiconductor constituent, and wherein said pulsed laser beam has temporal pulse widths of the order of femtoseconds.

22. The method for varying optical properties of a photonic crystal according to claim 20 wherein said pulsed laser beam is focused through a mask means onto said photonic crystal, said mask means having a pre-selected pattern for illuminating said photonic crystal with said pre-selected pattern whereby a selected pattern of free carriers is produced spatially across the photonic crystal that locally alters the effective refractive index with said pre-selected pattern.

23. The method for varying optical properties of a photonic crystal according to claim 22 wherein said mask means is a phase shift mask which is electrically tunable for controllably varying said pattern of free carriers.

24. The method for varying optical properties of a photonic crystal according to claim 22 wherein said mask means is an amplitude mask.

25. A photonic switching device, comprising:
    a photonic crystal having at least one semiconductor constituent with an effective refractive index which determines propagation characteristics of light beams propagating in said photonic crystal;
    light coupling means for coupling at least one light beam into the photonic crystal;
    energy source means for producing a pulsed energy beam having pulses with temporal pulse widths in a selected range of times and having sufficient energy to generate free carriers in said semiconductor constituent, and optical directing means for directing said pulsed energy beam onto said photonic crystal, whereby when free carriers are generated in said semiconductor by said pulsed energy beam, variations in the effective refractive index of the semiconductor are induced which alter the propagation characteristics of the light beam as it propagates through said photonic crystal on time scales comparable to said temporal pulse widths.

26. The photonic switching device according to claim 25 wherein said pulsed energy beam is a pulsed laser beam having a beam energy greater or equal to a bandgap energy between a valence band and conduction band of said semiconductor constituent, and wherein said pulsed laser beam has temporal pulse widths in a range from milliseconds to femtoseconds so that said free carriers are optically produced in said semiconductor constituent and wherein said effective refractive index is varied on a time scale in a range from milliseconds to femtoseconds.

27. The photonic switching device according to claim 25 wherein said pulsed energy beam is a pulsed laser beam having a beam photon energy sufficient to excite charge carriers into defect levels from a valence band or from defect levels into a conduction band, said defect levels being located between a valence band and a conduction band of said semiconductor constituent, and wherein said pulsed laser beam has temporal pulse widths in a range from milliseconds to femtoseconds so that said free carriers are optically produced in said semiconductor constituent and wherein said effective refractive index is varied on a millisecond-to-femtosecond timescale.

28. The photonic switching device according to claim 25 wherein said temporal pulse widths are of the order of femtoseconds.

29. The photonic switching device according to claim 25 wherein said means for directing said pulsed energy beam onto said photonic crystal includes a mask means and optical focusing means for directing said pulsed energy beam through said mask means onto said photonic crystal.

30. The photonic switching device according to claim 29 wherein said pulsed energy beam is a pulsed laser beam, and wherein said mask means has a pre-selected pattern of apertures so that said pulsed laser beam focussed onto said photonic crystal has said pre-selected pattern thereby producing a pre-selected pattern of free carriers in said semiconductor constituent which alters the propagation characteristics of the light beam coupled into said photonic crystal in a selected manner.

31. The photonic switching device according to claim 29 wherein said mask means is a phase shift mask which is electrically tunable for controllably varying said pattern of free carriers.

32. The photonic switching device according to claim 29 wherein said mask means is an amplitude mask.

33. The photonic switching device according to claim 26 wherein said photonic crystal includes at least one complete photonic bandgap.

34. The photonic switching device according to claim 33 wherein said at least one light beam is an information bearing light beam, and wherein said pre-selected pattern is chosen to alter optical properties of the photonic crystal including said at least one photonic bandgap, stop-gaps and dispersion curves associated with light waves outside the photonic bandgap for varying group velocities, polarization, amplitude, pulse width, spatial direction of propagation of said information bearing light beam propagating in said photonic crystal and time of transit of said light beam propagating in the photonic crystal.

35. The photonic switching device according to claim 25 wherein said light beam is an information bearing light beam, including optical analyzing means optically coupled to said photonic crystal, wherein when said information bearing light beam with said altered propagation characteristics exits said photonic crystal it is optically routed into said optical analyzing means for analysing information contained therein.

36. The photonic switching device according to claim 26 wherein the photonic crystal is a thin-film planar two-dimensional photonic crystal and the pulsed energy beam is directed onto said thin-film planar two-dimensional photonic crystal from above or below a plane of the planar photonic crystal.

37. The photonic switching device according to claim 36 wherein the thin-film planar two-dimensional photonic crystal includes at least one resonator which couples light at selected wavelengths out of the device plane, in which the wavelength of said selected wavelengths is varied by the free carriers produced globally or locally by the pulsed energy source.

38. The photonic switching device according to claim 36 wherein the thin-film two-dimensional photonic crystal includes devices integrated into the structure of the thin-film two-dimensional photonic crystal devices selected from the group consisting of waveguides, gratings, mirrors, resonators, lasers, amplifiers, limiters, attenuators, couplers, splitters, multiplexers, diffractive elements, polarizers, isolators, circulators, interferrometers and modulators integrated therewith, the properties of which are varied via the presence of free-carriers produced globally or locally by the pulsed energy source.

39. The photonic switching device according to claim 26 wherein the photonic crystal is a thin-film planar two-dimensional photonic crystal and wherein the semiconductor constituent of said thin-film planar two-dimensional photonic crystal includes one of a homojunction and heterojunction, and wherein said means for producing a pulsed energy beam includes electrical injection means electrically coupled to said one of the homojunction and heterojunction for injecting free carriers into a volume of said thin film photonic crystal in which a light beam propagates.

40. A method for varying optical properties of a dielectric material comprising at least a semiconductor constituent, the at least a semiconductor constituent having an effective refractive index, comprising:
  directing a selectively patterned pulsed energy beam onto said dielectric material with the pulsed energy beam having pulses with temporal pulse widths in a selected range of times and having sufficient energy to generate a selected 1, 2 or 3-dimensional pattern of free carriers in a conduction band of said semiconductor constituent for producing variations in the effective refractive index of the semiconductor constituent thereby varying optical properties of said dielectric material on a time scale of said temporal pulse widths.

41. The method according to claim 40 wherein said at least a semiconductor constituent is the only constituent so that said dielectric material is a semiconductor.

42. The method according to claim 40 wherein said dielectric material includes a dielectric constituent having a refractive index sufficiently different from the effective refractive index of said semiconductor constituent to provide sufficient contrast so that said dielectric material is a photonic crystal.

43. The method according to claim 41 wherein directing the selectively patterned pulsed energy beam onto the semiconductor includes directing at least two pulsed energy beams onto said dielectric material to produce said 1, 2 or 3-dimensional pattern of free carriers by optical interference.

44. The method according to claim 41 wherein the selectively patterned pulsed energy beam is directed onto said semiconductor through a mask means, said mask means having a mask pattern for illuminating said semiconductor with said mask pattern to generate said selected 1, 2 or 3-dimensional pattern of free carriers.

45. The method according to claim 44 wherein said mask means is a phase shift mask which is electrically tunable for controllably varying said pattern of free carriers.

* * * * *